(12) United States Patent
Zhong et al.

(10) Patent No.: US 8,375,379 B2
(45) Date of Patent: Feb. 12, 2013

(54) IMPORTING LANGUAGE EXTENSION RESOURCES TO SUPPORT APPLICATION EXECUTION

(75) Inventors: Wei Ning Zhong, Burnaby (CA); Bonnie Yuk-Yee Cheng, Coquitlam (CA)

(73) Assignee: SAP France S.A., Paris (FR)

( * ) Notice: Subject to any disclaimer, the term of this patent is extended or adjusted under 35 U.S.C. 154(b) by 1024 days.

(21) Appl. No.: 12/023,786

(22) Filed: Jan. 31, 2008

(65) Prior Publication Data

US 2009/0199172 A1 Aug. 6, 2009

(51) Int. Cl.
G06F 9/44 (2006.01)
G06F 9/445 (2006.01)

(52) U.S. Cl. .................... 717/168; 717/176; 717/178

(58) Field of Classification Search .................. None
See application file for complete search history.

(56) References Cited

U.S. PATENT DOCUMENTS

| | | | | |
|---|---|---|---|---|
| 6,252,589 | B1* | 6/2001 | Rettig et al. | 715/703 |
| 6,334,101 | B1* | 12/2001 | Hetherington et al. | 704/8 |
| 6,546,554 | B1* | 4/2003 | Schmidt et al. | 717/176 |
| 6,717,588 | B1* | 4/2004 | Miller et al. | 715/700 |
| 6,883,168 | B1* | 4/2005 | James et al. | 717/178 |
| 7,127,713 | B2* | 10/2006 | Davis et al. | 717/177 |
| 7,657,887 | B2* | 2/2010 | Kothandaraman et al. | 717/176 |
| 7,735,076 | B2* | 6/2010 | Sawyer | 717/168 |
| 7,757,227 | B2* | 7/2010 | Duplessis et al. | 717/173 |
| 7,814,484 | B2* | 10/2010 | Griffith et al. | 717/178 |
| 7,886,289 | B2* | 2/2011 | Anand et al. | 717/168 |
| 7,930,167 | B2* | 4/2011 | Young et al. | 704/8 |
| 2003/0167320 | A1* | 9/2003 | Perez | 709/223 |
| 2006/0031833 | A1* | 2/2006 | Huang et al. | 717/178 |
| 2006/0106915 | A1* | 5/2006 | Fujisawa | 709/208 |
| 2006/0136220 | A1* | 6/2006 | Gurram et al. | 704/275 |
| 2006/0210026 | A1* | 9/2006 | Duplessis et al. | 379/88.05 |
| 2007/0044091 | A1* | 2/2007 | Banerjee | 717/176 |
| 2007/0101322 | A1* | 5/2007 | Muschett et al. | 717/168 |
| 2007/0245338 | A1* | 10/2007 | Musha | 717/173 |
| 2008/0134162 | A1* | 6/2008 | James et al. | 717/168 |

OTHER PUBLICATIONS

Herbert Yu, Multiple language support for MFC applications with extension DLL, 2005, pp. 1-6.*
Gil Francopoulo, Lexical markup framework for NLP multilingual resources, 2006, pp. 1-7.*
Oracle, Developing Multilingual J2EE Web Applications using Oracle JDeveloper 10g, Oracle Whitepaper, 2004, pp. 9-15.*

* cited by examiner

*Primary Examiner* — Thuy Dao
*Assistant Examiner* — Mongbao Nguyen
(74) *Attorney, Agent, or Firm* — Mintz, Levin, Cohn, Ferris, Glovsky and Popeo, P.C.

(57) ABSTRACT

A computer readable storage medium includes executable instructions to provide a registration service that is configured to accept a registration, where the registration includes a first address and a description of available language extension resources of a resource provider. The computer readable storage medium further includes executable instructions to import, based on the registration, the available language extension resources from the resource provider to support execution based on the available language extension resources. The executable instructions to import use inter-process communication.

20 Claims, 2 Drawing Sheets

IMPORTING LANGUAGE EXTENSION RESOURCES TO SUPPORT APPLICATION EXECUTION

FIELD OF THE INVENTION

The present invention relates generally to data retrieval and processing. More particularly, this invention relates to importing language extension resources to support execution of an application based on the language extension resources.

BACKGROUND OF THE INVENTION

Business Intelligence (BI) generally refers to software tools used to improve business enterprise decision-making. These tools are commonly applied to financial, human resource, marketing, sales, service provider, customer, and supplier analyses. More specifically, these tools can include reporting and analysis tools for presenting information, content delivery infrastructure systems for delivering and managing reports and analytics, and data warehousing systems for cleansing and consolidating information from disparate sources. BI tools may work with data management systems, such as relational databases or On Line Analytic Processing (OLAP) systems used to collect, store, and manage raw data.

Application software including BI tools can facilitate user productivity with multilingual support, which can enable a user to view and work with data in a language desired by the user. A vendor typically releases software with a sub-set of the languages that the software is capable of supporting. The software is typically deployed, or installed in a production environment, so that the software is executing based on the sub-set of languages. Later, additional languages can be added by releasing "language packs." A language pack is a collection of language extension resources (e.g., strings, graphics, recorded media, other name-value pairs, files, executable instructions) needed by software to support or partially support one or more languages. These language packs are normally applied as a patch to the deployed software.

Vendors commonly ship application software in a self-contained form such as Web Application Archive (WAR) or Java Archive (JAR) format, so that the software can be deployed on remote or isolated computers. WAR files may include eXtensible Markup Language (XML) files, Java classes, Java server pages, and other objects for a web application. A self-contained application typically does not use outside resources to enable execution of the application. In the case of self-contained applications with multilingual support, resources for language support typically are inside the WAR file when the WAR file is created. This means that deployed software is re-deployed with the language extension resources, which can create a significant service interruption problem.

The problem is illustrated by one example of a patching process. The patching process includes uncompressing the original WAR file, then copying the language extension resources into the original WAR file to create a modified WAR file, and then recompressing the modified WAR file. To deploy the modified WAR file, the original WAR file is typically undeployed, which translates into an interruption of the services provided by the application defined by the original WAR file. The length of the service interruption can be magnified due to the time required to uncompress and recompress large WAR files.

In view of the foregoing problems, it would be desirable to provide improved techniques for enabling multilingual applications to execute with language extension resources.

SUMMARY OF THE INVENTION

This invention includes a computer readable storage medium with executable instructions to provide a registration service that is configured to accept a registration, where the registration includes a first address and a description of available language extension resources of a resource provider. The computer readable storage medium further includes executable instructions to import, based on the registration, the available language extension resources from the resource provider to support execution based on the available language extension resources. The executable instructions to import use inter-process communication.

In another embodiment, the invention includes a computer readable storage medium with executable instructions to accept a first address of a first registration service and to send a registration including a second address for requesting available language extension resources and a description of the available language extension resources, where the registration is sent based on the first address of the first registration service. The computer readable storage medium further includes executable instructions to provide the available language extension resources in response to a request based on the registration. The executable instructions to send and to provide use inter-process communication.

In another embodiment, the invention includes a system. The system includes an application server that provides a registration service at a first address, and a resource server that is configured to provide available language extension resources to the application server based on a request from the application server, where the request from the application server is based on a registration with the registration service, and where the registration includes a second address of the resource server and a description of the available language extension resources. The system further includes an address server that provides first location information to the resource server, where the registration is sent based on the first location information. In the system, the application server and the resource server use inter-process communication to communicate, and the available language extension resources are imported by the application server to support execution of the application server.

BRIEF DESCRIPTION OF THE DRAWINGS

For a better understanding of the nature and objects of the invention, reference should be made to the following detailed description taken in conjunction with the accompanying drawings, in which.

DETAILED DESCRIPTION OF THE INVENTION

The invention is operative with a data source. A data source is an information resource. Data sources include sources of data that enable data storage and retrieval. Data sources may include databases, such as, relational, transactional, hierarchical, multidimensional (e.g., OLAP), object oriented databases, and the like. Further data sources may include tabular data (e.g., spreadsheets, delimited text files), data tagged with a markup language (e.g., XML data), transactional data, unstructured data (e.g., text files, screen scrapings), hierarchical data (e.g., data in a file system, XML data), files, a plurality of reports, and any other data source accessible through an established protocol, such as, Open DataBase Connectivity (ODBC) and the like. Data sources may also include a data source where the data is not stored like data streams, broadcast data, and the like.

The invention is also operative with Web Services. Web Services (WS) are a class of protocols for inter-system communication. WS are for distributed computing and network communication and provide a common object model, make information about the data available to other systems, and add metadata to the data requested. On top of this basic communication framework other services can be added. One kind of WS includes an XML base that facilitates interoperability among systems. A Web Service has an interface that is specified in a format such as the Web Service Description Language (WSDL). A WS can use SOAP (also known as Simple Object Access Protocol) as the foundation layer providing the basic communication framework. SOAP is a protocol for exchanging XML messages over a computer network. Other systems interact with the web service in a manner prescribed by the interface of the WS.

Figure 1:
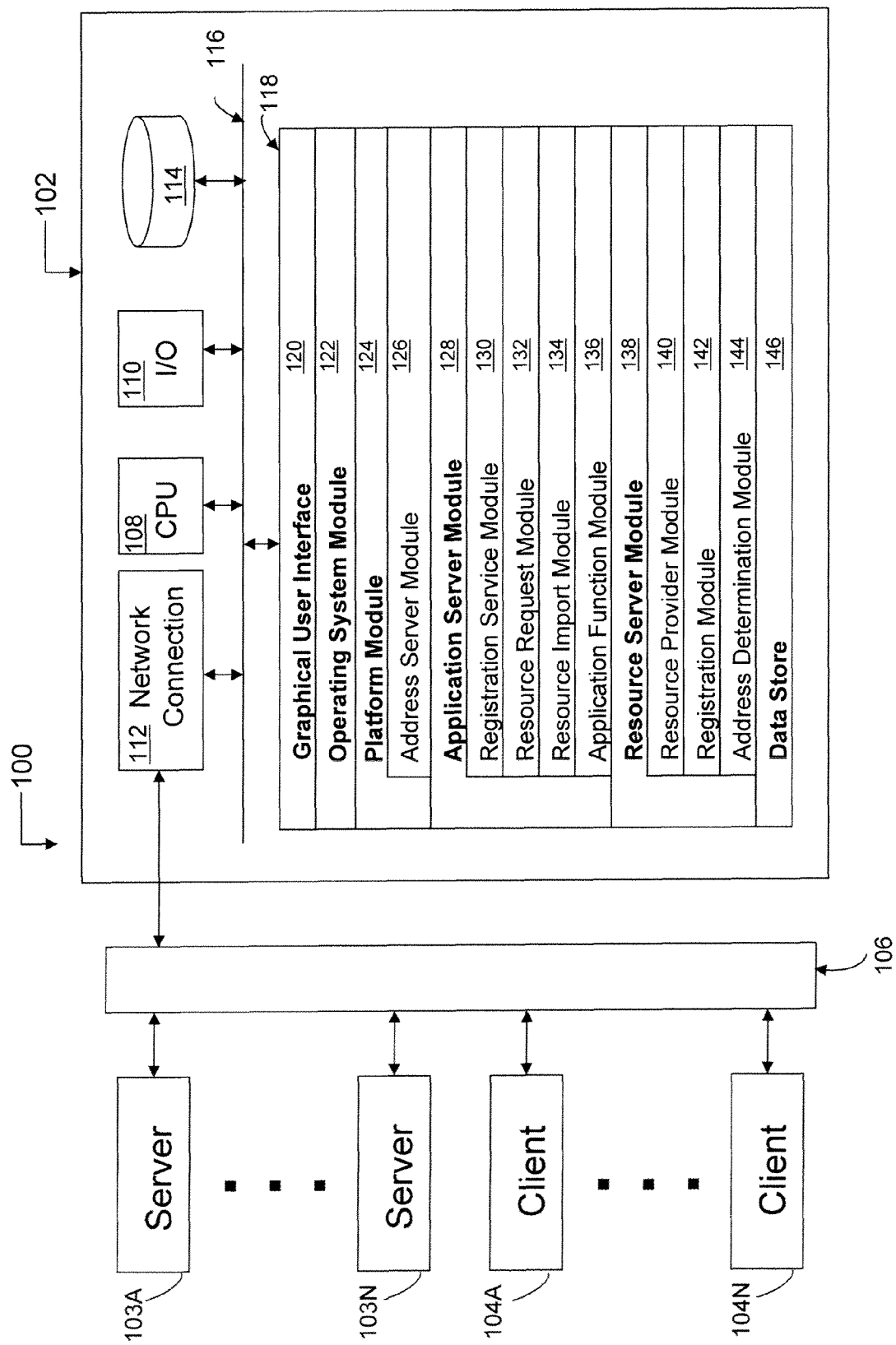
FIG. 1 illustrates a system for importing language extension resources to support application execution, in accordance with one embodiment of the present invention.

FIG. 1 illustrates a system 100 for importing language extension resources to support application execution, in accordance with one embodiment of the present invention. One goal of the system 100 is to enable a self-contained application to execute based on language extension resources not included in the application on initial deployment, without necessitating the redeployment of the self-contained application and the associated service interruption. A self-contained application is an application that typically does not use outside resources to enable execution of the application. This enables the installation of the application on remote or isolated computers. However, while a self-contained application may not use an outside resource, a self-contained application may import resources from outside the self-contained application and use those resources locally. For example, the system 100 can be designed to enable the self-contained application to import available language extension resources. These imported language extension resources may be cached in memory allocated to the self-contained application. To support the importing of available language extension resources, a self-contained application, such as a Java application running on a Java Application Server, can have the capability to exchange information with other processes using inter-process communication (IPC). The importing of the available language extension resources can allow the self-contained application to execute based on the imported language extension resources without necessitating redeployment.

The system 100 includes a transmission channel 106 connecting a computer 102 with servers 103A-103N and clients 104A-104N. The computer 102 includes standard components, such as a network connection 112, a CPU 108, input/output devices 110, and a data source 114, which communicate over a bus 116. The memory 118 stores a set of executable programs that are used to implement functions of the invention. The servers 103 and clients 104 typically include the same standard components. The data source 114 may be internal and/or external to the computer 102. The data store module 146 may read data from and write data to memory 118 or to data source 114.

In an embodiment of the invention, the memory 118 includes executable instructions establishing the various modules shown in FIG. 1. The graphical user interface module 120 allows the user to interact with the other modules contained in memory 118. The operating system module 122 handles basic system services, such as file service management, memory management, inter-process communication, and allocation of hardware dependent tasks. The platform module 124 manages and provides resources to additional software modules, such as the application server module 128 and the resource server module 138. An example of the platform module 124 is a Java platform including a Java Virtual Machine™. The platform module includes an address server module 126. In one embodiment, the address server module 126 installs additional modules, including the application server module 128 and/or the resource server module 138.

The application server module 128 is a self-contained application, and may include sub-modules. The application function module 136 supports the primary functions of the application. The registration service module 130 provides a registration service for the resource server module 138. The resource request module 132 requests resources from the resource server module 138. The resource import module 134 imports available resources from the resource server module 138 to support the execution of the application function module 136, and may store the retrieved resources using the data store module 146.

The resource server module 138 provides resources to the application server module 128. The resource server module 138 is also a self-contained application, and may include sub-modules. The registration module 142 may interact with the address server module 126 and the registration service module 130 to register the resource server module 138 with the registration service provided by the application server module 128. The resource provider module 140 provides language extension resources to support execution of the application server 128. The address determination module 144 may determine the address of the registration service provided by the application server module 128 and/or the address of the resource server module 138 based on location information provided to the resource server module 138 by the address server module 126.

The modules in memory 118 are exemplary. The function of individual modules may be combined. In addition, the modules may reside on a single computer 102, or may be distributed across a network. For example, an application server 128 may reside on computer 102 and may provide a registration service for resource server modules 130 residing on computer 102 and/or servers 103A-103N. It is the processing associated with the invention that is significant, not where or how the processing is implemented.

Figure 2:
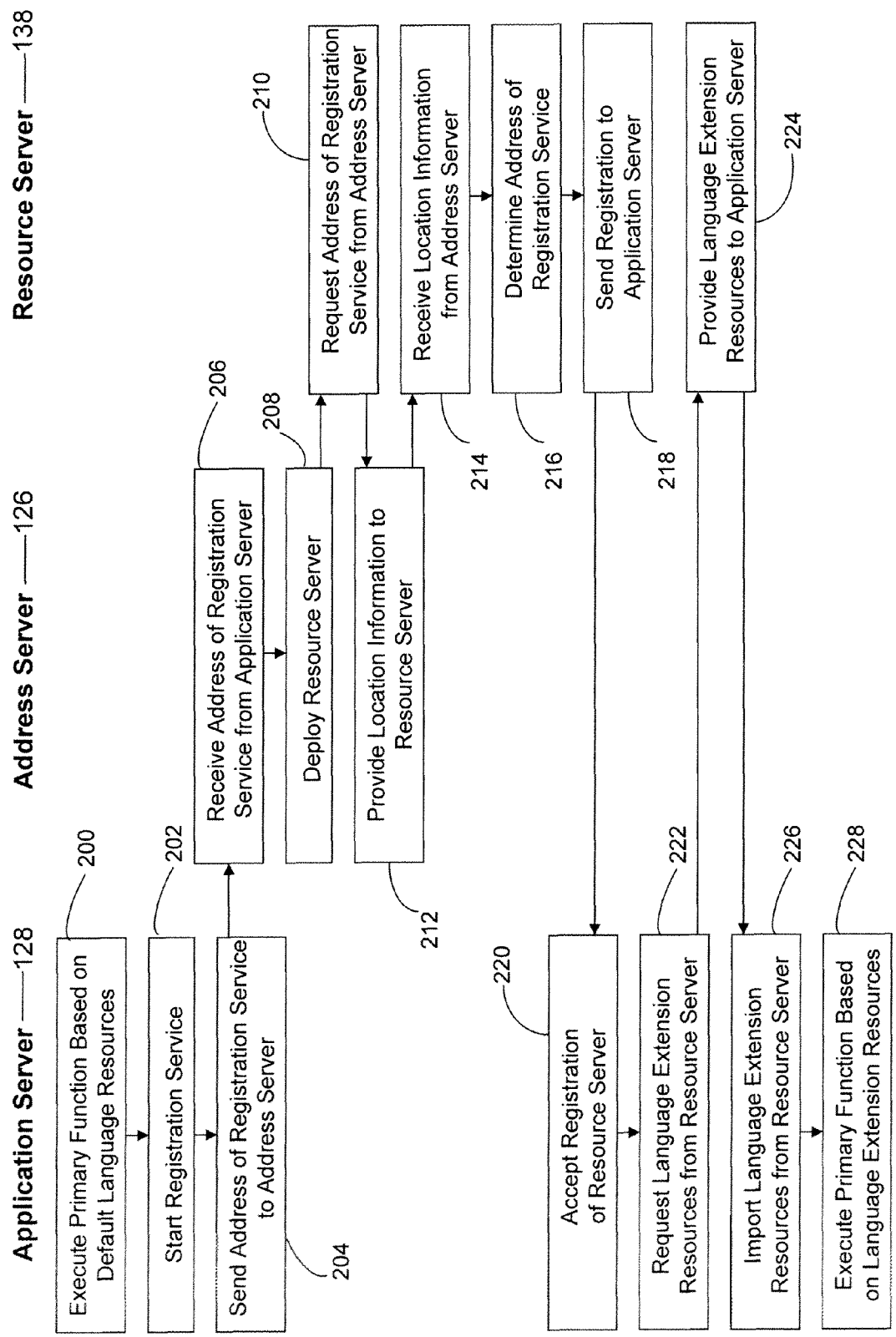
FIG. 2 illustrates operations associated with importing language extension resources to support application execution, in accordance with one embodiment of the present invention.

FIG. 2 illustrates operations associated with importing language extension resources to support application execution, in accordance with one embodiment of the present invention. Initially, the application server 128 executes its primary function based on default language resources (block 200). The primary function of the application server 128 is typically the service or feature that the application server 128 is built and installed to provide, and is executed by the application function module 136. The application server 128 may be a program or a part of a program. The default language resources may be shipped with the application server 128 as part of a JAR file and/or a WAR file, so that the default language resources are accessible to an application server 128 installed on a remote or isolated computer 102 or server 103.

The application server 128 then starts a registration service (block 202) that is configured to accept a registration from another process running on computer 102 or server 103. For example, the registration service accepts a registration from each of one or more resource servers 138. The registration service enables a resource server 138 installed after the application server 128 to provide address information for the resource server 138 and a description of language extension resources available from the resource server 138. The registration service is provided by the registration service module 130. In one embodiment, the registration service may be implemented as a servlet in a Java application. A servlet is a small computer program designed to add a capability to the larger application server 128. For example, the application server 128 may have many servlets, each written in Java, and each designed to handle a specific task. The registration service module 130 may include a web.xml file that defines a servlet for providing the registration service. The web.xml file may identify the name of the servlet, the Java class associated with the servlet, and a mapping of the servlet name to a Uniform Resource Identifier (URI) or a portion of a URI that may be referenced by the resource server 138 when sending a registration to the application server 128.

The application server 128 then sends an address of the registration service (block 204) that is received by the address server 126 (block 206). The application server 128 may use IPC to communicate with the address server 126. In one embodiment, the address server 126 is an application that is separate from the resource server 138. The address server 126 may store the address of the registration service within a list of registration service addresses, where each registration service address corresponds to one of multiple application servers 128. The address may be a URI or a portion of a URI that references the registration service provided by the application server 128. In another embodiment, the application server 128 may also provide an address of the resource server 138, where the address may be a URI or a portion of a URI that the application server 128 may use to reference the resource server 138. This may be done to support reverse proxy, such as when the resource server 138 and the application server 128 are both accessed through a proxy server. For example, Hypertext Transfer Protocol (HTTP) requests beginning with http://server:8080 may be routed through the proxy server. The application server 128 may provide location information http://server:8080/InfoView referencing the application server 128, and location information http://server:8080/language-pack-zu referencing the location of language extension resources in the resource server 138.

The address server 126 may be an installer that deploys each of the one or more resource servers 138 (block 208). If the resource server 138 is packaged as an aggregation of files and executable instructions, such as a JAR or WAR file, the installer performs decryption, decompression, and de-aggregation as part of the installation of the resource server 138.

Once deployed, each of the one or more resource servers 138 requests location information (block 210) that is provided by the address server 126 (block 212) and received by the resource server 138 (block 214). The resource server 138 may use IPC to communicate with the address server 126. In one embodiment, the address server 126 is an application that is separate from the application server 128. As described previously, the location information may include a URI or a portion of a URI that references the registration service provided by the application server 128, and/or that references the resource server 138.

The resource server 138 may then determine the address of the registration service from the location information (block 216). The location information may include the complete address information for the registration service provided by the application server 128, or may include absolute location information referencing the application server 128. The address determination module 144 of the resource server 138 may combine this absolute location information with a relative address associated with the registration service module 130. As described previously, this address determination may be useful to support capabilities such as reverse proxy. For example, the resource server 138 may be shipped with relative address information /provider.registrar for the registration service module 130, and may receive absolute location http://server:8080/InfoView referencing the application server 128. After combining, the address determination module 144 may determine the address of the registration service module 130 as http://server:8080/InfoView/provider.registrar. In a similar fashion, the address determination module 144 may determine the address of language extension resources in the resource server 138.

The registration module 142 of the resource server 138 then sends a registration (block 218) that is accepted by the registration service module 130 of the application server 128 (block 220). The registration is sent based on the address of the registration service offered by the application server 128. The registration includes an address for requesting resources from the resource server 138 and a description of the language extension resources available on the resource server 138. The address may be used by the application server 128 to request available language extension resources from the resource provider module 140 of the resource server 138.

As the resource server 138 and the application server 128 are both self-contained applications, the resource server 138 and the application server 128 must use IPC to communicate with each other. IPC refers to communication between processes, where the processes may run on one or more computers 102 that may communicate over a network. Software components in the same process may also use IPC to communicate. The communication may be for purposes including passing information between processes and process management. IPC may be based on Web Services on top of HTTP on top of sockets. IPC may alternatively be based on techniques such as shared memory, signaling, and message passing.

The resource request module 132 may then request language extension resources from the resource server 138 (block 222). In one embodiment, the request is based on a pre-existing definition of the language extension resources. For example, the language extension resources may be known at application design time based on a language and/or function, where the language extension resources may facilitate support of the language and/or function. A single resource server 138 may provide language extension resources corresponding to one or more languages and/or functions.

In one embodiment, a Java class on the application server 128 may be defined based on the language and/or function of particular language extension resources. The request (block 222) may be based on a call to an accessor method of a class defined based on the language extension resources. An accessor method typically is a method by which the state of objects can be accessed from other parts of a program. From a software design perspective, defining classes based on a pre-existing definition of the language extension resources is not burdensome because these classes can be stub classes that inherit from a common parent class that actually contains the implementation. Each stub class has a name that is localized to provide an indication of the language and/or function of the language extension resources that the class is used to request.

The request (block 222) may trigger attempts to load language extension resources from the resource provider module 140 of the resource server 138. For example, the call to the accessor method may trigger a call to a static method get-Bundle defined in the parent class that attempts to get a resource bundle from the resource provider module 140. The resource bundle may be a hash table map or an equivalent that pairs up identifiers and values. In one embodiment, the static method getBundle may attempt to get a resource bundle using input parameters including a base name, a locale, and a class loader identification. The base name may be a string indicating a language, and the locale may indicate a language and an associated country. These input parameters may be determined based on the description of the language extension resources available on the resource server 138 provided in the registration (block 220).

In one embodiment, the static method getBundle may generate candidate bundle names based on the base name and the locale. The candidate bundle names may also be generated based on the locale associated with the default language extension resources. The static method getBundle then may iterate over the candidate bundle names to find one for which getBundle can instantiate and load a result resource bundle.

If the requested language extension resources are available, then the resource provider module 140 provides the requested language extension resources to the application server 128 (block 224). The resource import module 134 of the application server module 128 then imports the language extension resources from the resource provider module 140 (block 226). The application server 128 may cache a copy of the language extension resources in memory allocated to the application server 128. The application server 128 may also use the data store module 146 to store a copy of the language extension resources in data store 114. In one embodiment, if the static method getBundle is able to instantiate and load a result resource bundle, then the requested language extension resources are available, and are subsequently provided by the resource provider module 140 for import by the resource import module 134.

The language extension resources may include at least one resource of the following types: strings, graphics, recorded media, name-value pairs, files, and executable instructions. The language extension resources provided by a resource server 138 may facilitate support of one or more languages. In one embodiment, it is desirable to restrict the language extension resources provided by the resource server 138 to support of a single language. This enables language capabilities to be individually added or removed from the application server 128 by deploying or undeploying individual resource servers 138. The language extension resources may also support static content, such as data files, or dynamic content, such as instructions executable on a Java application server.

In one embodiment, the static method getBundle may first attempt to load dynamic content such as a class using the candidate bundle name. If such a class can be found, instantiated, and loaded using the class loader identification parameter, then getBundle may create a new instance of this class and use it as the result resource bundle. This class may dynamically load the actual language extension resources from the resource provider module 140. If there is no dynamic content available, then the static method getBundle may attempt to locate a static property resource file based on the candidate bundle name. If getBundle is able to locate the property resource file, then getBundle may attempt to create a result resource bundle from the file contents.

The application function module 136 of the application server 128 then can execute its primary function based on the language extension resources (block 228). After importation of the language extension resources from the resource server 138, the imported language extension resources are locally accessible to the application server 128, like the default language resources (block 200). The application server 128 can use the imported language extension resources without being redeployed by the address server 126. Moreover, the operations associated with importing Language extension resources to support application execution of FIG. 2 can be performed without interrupting ongoing execution based on the default language resources.

An embodiment of the present invention relates to a computer storage product with a computer-readable medium having computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media such as hard disks, floppy disks, and magnetic tape; optical media such as CD-ROMs, DVDs and holographic devices; magneto-optical media; and hardware devices that are specially configured to store and execute program code, such as application-specific integrated circuits ("ASICs"), programmable logic devices ("PLDs") and ROM and RAM devices. Examples of computer code include machine code, such as produced by a compiler, and files containing higher-level code that are executed by a computer using an interpreter. For example, an embodiment of the invention may be implemented using Java, C++, or other object-oriented programming language and development tools. Another embodiment of the invention may be implemented in hardwired circuitry in place of, or in combination with, machine-executable software instructions.

The foregoing description, for purposes of explanation, used specific nomenclature to provide a thorough understanding of the invention. However, it will be apparent to one skilled in the art that specific details are not required in order to practice the invention. Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications, they thereby enable others skilled in the art to best utilize the invention and various embodiments with various modifications as are suited to the particular use contemplated. It is intended that the following claims and their equivalents define the scope of the invention.

What is claimed is:

1. A non-transitory computer readable storage medium, comprising executable instructions to:

provide a registration service that is configured to accept a registration, wherein the registration includes a first address and a description of available language extension resources of a resource provider, the language extension resources providing multilingual support allowing a user to view and work with data in a language desired by the user; and import to a self contained application, based on the registration, the available language extension resources from the resource provider to support execution based on the available language extension resources, wherein the self-contained application does not use outside resources during execution;

wherein:

an application server provides the registration service at a first address;

a resource server provides the available language extension resources to the application server based on a request from the application server;
the request from the application server is based on a registration with the registration service;
the registration includes a second address of the resource server and a description of the available language extension resources;
an address server provides first location information to the resource server and the registration is sent based on the first location information;
the application server and the resource server communicate by inter-process communication; and
the available language extension resources are imported by the application server to support execution of the application server.

2. The computer readable storage medium of claim 1, wherein the language extension resources include at least one of strings, graphics, name-value pairs, files, recorded media, and executable instructions.

3. The computer readable storage medium of claim 1, wherein the language extension resources include dynamic content including instructions executable on a Java application server.

4. The computer readable storage medium of claim 1, wherein the language extension resources facilitate support of more than one language.

5. The computer readable storage medium of claim 1, wherein the registration service is a servlet in a Java application.

6. The computer readable storage medium of claim 1, wherein the inter-process communication is based on Web Services (WS) on top of the Hypertext Transfer Protocol (HTTP) on top of sockets.

7. The computer readable storage medium of claim 1, further comprising executable instructions to request language extension resources based on a pre-existing definition of the language extension resources.

8. The computer readable storage medium of claim 7, wherein the executable instructions to request are based on a call to an accessor method of a class defined based on the language extension resources.

9. The computer readable storage medium of claim 8, wherein the language extension resources facilitate support of a language or a function.

10. The computer readable storage medium of claim 1, wherein the executable instructions to provide and to import execute concurrently with default language resources.

11. The computer readable storage medium of claim 1, further comprising executable instructions to send a second address of the registration service to an application that is separate from the resource provider.

12. A non-transitory computer readable storage medium, comprising executable instructions to:
accept, by a resource server, a first address of a first registration service from an application server;
send, by the resource server, a registration including a second address for requesting available language extension resources and a description of the available language extension resources, wherein the registration is sent based on the first address of the first registration service, and wherein the language extension resources provide multilingual support allowing a user to view and work with data in a language desired by the user, wherein the request from the application the application server is based on a registration with the registration service; and
provide, by the resource server, to a self contained application on the application server the available language extension resources in response to a request based on the registration wherein the self-contained application does not use outside resources during execution;
wherein the resource server and the application server communicate by inter-process communication; and
wherein the available language extension resources are imported by the application server to support execution of the application server.

13. The computer readable storage medium of claim 12, wherein the first address is of a first application offering the first registration service, and wherein the available language extension resources are provided to the first application.

14. The computer readable storage medium of claim 13, further comprising executable instructions to request a plurality of addresses of registration services, including the first address of the first registration service, from a second application.

15. A system having at least one processor and at least one memory for storing at least one computer-readable instruction for execution on the at least one processor, the system comprising:
an application server that provides a registration service at a first address;
a resource server configured to provide available language extension resources to the application server based on a request from the application server, wherein the language extension resources provide multilingual support allowing a user to view and work with data in a language desired by the user, wherein the request from the application server is based on a registration with the registration service, and wherein the registration includes a second address of the resource server and a description of the available language extension resources; and
an address server that provides first location information to the resource server, wherein the registration is sent based on the first location information;
wherein the application server and the resource server communicate by inter-process communication;
wherein the available language extension resources are imported by the application server to support execution of the application server; and
wherein the application server is self contained and does not use outside resources during execution.

16. The system of claim 15, wherein the address server is an installer that deploys the resource server, and that provides the first location information in response to a request from the resource server.

17. The system of claim 16, wherein:
the address server provides second location information to the resource server; and
the resource server determines the first address by combining the first location information with first relative address information associated with the registration service, and determines the second address by combining the second location information with second relative address information associated with the resource server.

18. The system of claim 16, wherein the resource server is defined by a first Web Application Archive (WAR) file, and the application server is defined by a second WAR file.

19. The system of claim 18, wherein the application server uses the language extension resources without being redeployed by the address server.

20. The system of claim 18, wherein the application server caches a copy of the language extension resources.

* * * * *